United States Patent [19]

Schuil

[11] 4,024,070

[45] May 17, 1977

[54] METHOD OF MANUFACTURING A CERIUM ACTIVATED LUMINESCENT RARE-EARTH ALUMINATE

[75] Inventor: Roelof Egbert Schuil, Emmasingel, Netherlands

[73] Assignee: U.S. Philips Corporation, New York, N.Y.

[22] Filed: May 16, 1975

[21] Appl. No.: 578,165

[30] Foreign Application Priority Data

May 24, 1974 Netherlands ................... 7406960

[52] U.S. Cl. ........................................ 252/301.4 R
[51] Int. Cl.$^2$ ........................................ C09K 11/46
[58] Field of Search ............. 252/301.4 R; 423/263

[56] References Cited

UNITED STATES PATENTS

| 3,564,322 | 2/1971 | Blasse | 252/301.4 R X |
| 3,577,350 | 5/1971 | Amster | 252/301.4 R |
| 3,623,994 | 11/1971 | Royce et al. | 252/301.4 R |
| 3,657,140 | 4/1972 | Gibbons et al. | 252/301.4 R |

FOREIGN PATENTS OR APPLICATIONS

| 4,633,002 | 9/1971 | Japan | 252/301.4 R |
| 267,784 | 7/1970 | U.S.S.R. | 257/301.4 R |
| 236,441 | 6/1969 | U.S.S.R. | 423/263 |

*Primary Examiner*—Jack Cooper
*Attorney, Agent, or Firm*—Frank R. Trifari; Norman N. Spain

[57] ABSTRACT

A method of manufacturing a rare-earth aluminate, particularly a luminescent rare-earth aluminate, in which a starting mixture of the composite oxides or of compounds producing these oxides at an elevated temperature together with a flux is heated at a high temperature. At least one of the compounds rubidium fluoride, cesium fluoride and potassium fluoride is used as a flux.

6 Claims, No Drawings

METHOD OF MANUFACTURING A CERIUM ACTIVATED LUMINESCENT RARE-EARTH ALUMINATE

The invention relates to a method of manufacturing a rare-earth aluminate, particularly a luminescent rare-earth aluminate. Furthermore, the invention relates to the aluminate manufactured by this method.

The aluminates of one or more of the rare earths are used in different important fields of technical applications. In this description and in the claims the rare earths to be denoted by the general symbol Ln are understood to include the elements having atomic numbers 57 to 71 and the element yttrium. An important group of rare-earth aluminates may be defined by the formula $Ln_3Al_5O_{12}$. These materials have the garnet crystal structure and are used, for example, as laser material or as a luminescent material. Generally, part of the element chosen for Ln is replaced by another rare-earth element serving as an activator. Known laser materials are neodymium-activated yttrium aluminate and thulium-activated erbium aluminate. A known, very efficient luminescent material having a very short persistence is cerium-activated yttrium aluminate whose most important use is in cathode ray tubes for flying spot scanners. Another group of rare-earth aluminates is defined by the formula $LnAlO_3$. These aluminates generally have the perovskite crystal structure. These materials are also used as luminescent materials in which again a generally small part of Ln serves as an activator, for example, cerium-activated $YAlO_3$.

It is generally desirable to have very pure, satisfactorily crystallized aluminates. So far this has only been possible if very cumbrous methods of manufacture are used. In order to obtain a luminescent cerium-activated yttrium aluminate having the garnet structure in the form of a satisfactorily crystallized powder, the starting material is, for example, a mixture of reactive hydroxides or carbonates of aluminum and the rare earths. This mixture is prepared by precipitation from a solution comprising $Y^{3+}$, $Al^{3+}$ and $Ce^{3+}$, for example, in nitrate form, with the aid of ammonium hydroxide, ammonium carbonate or ammonium hydrocarbonate. The precipitate thus obtained is very voluminous and jelly-like so that filtering and subsequent washing with water is very difficult and time-consuming. After drying of the mixture of hydroxides and/or carbonates thus obtained, it is preheated at a temperature of, for example, 300° C so as to remove the ammonium nitrate remainders left. To obtain a satisfactorily luminescent material, the mixture must subsequently be heated for 2 hours, for example, at a relatively high temperature, for example, 1400° C. The known method thus described has great drawbacks, particularly when comparatively large quantities of the luminescent material must be manufactured.

The rare-earth aluminates may alternatively be manufactured by starting from aluminum oxide and the rare-earth oxides. However, to obtain the desired reaction, a heat treatment at a very high temperature, for example, 1400°–1600° C has to be carried out. Another drawback of this method is that the resultant product is less satisfactorily crystallized. To decrease the reaction temperature and obtain a better crystallization of the product, it is known to add a so-called flux or meltig salt to the starting mixture of oxides. For example, part of the aluminum oxide in the starting mixture may be replaced by aluminum fluoride. A drawback of the use of $AlF_3$ as a flux is that this material is very hygroscopic and is thus not stable in the atmosphere. It has been found that the use of an $AlF_3$ hydrate for the manufacture of rare-earth aluminates yields very poor results. Netherlands Pat. Application 7213860 describes the use of ammonium chloride as a flux in the manufacture of a luminescent cerium-activated yttrium aluminate. After a preheating period in this method, a very long heat treatment has to be carried out, for example, for 16 hours at 1250°–1280° C. A major drawback of this known method is that the luminescent material obtained is found to have a persistence period which is considerably longer than the persistence period of aluminates prepared without a flux, so that the material is less suitable for practical purposes.

It is an object of the invention to provide a method of manufacturing rare-earth aluminates in which the drawbacks of the known methods are overcome.

According to the invention a method of manufacturing a rare-earth aluminate, particularly a luminescent rare-earth aluminate in which a starting mixture of the composite oxides or of compounds producing these oxides upon elevation of the temperature, together with a flux is heated at a high temperature is characterized in that at least one of the compounds rubidium fluoride, cesium fluoride and potassium fluoride is used as a flux.

It has been found that the use of rubidium fluoride and/or cesium fluoride and/or potassium fluoride as a flux in the manufacture of rare-earth aluminates enhances the reaction speed in such a manner that a starting mixture of aluminium oxide and rare-earth oxides (or of compounds producing these oxides at an elevated temperature) can be used, so that mixtures of very reactive hydroxides or carbonates are not necessary. In addition it has been found that there is a complete reaction at relatively low reaction temperatures. Finally, a method according to the invention is found to yield a very satisfactorily crystallized powder. An advantage of the method according to the invention is that the fluorides used as a flux are stable in air.

Comparatively large quantities of rare-earth aluminates having very satisfactory properties can be obtained in an economical manner with the aid of the method according to the invention. A great advantage of the method according to the invention is that luminescent rare-earth aluminates having very satisfactory luminescence properties can be obtained. Notably, the persistence period of these materials (approximately 0.1 $\mu$sec) is practically not affected.

In a method according to the invention it is advantageous to use rubidium and/or cesium and/or potassium fluoride in a quantity of from 0.1 to 15% by weight, calculated with respect to the starting mixture. With quantities of less than 0.1% by weight the resultant effect is poor and for quantities of more than 15% by weight materials having a lower brightness are obtained in the case of manufacture of luminescent aluminates. The fluoride is preferably used in quantities of from 1 to 10% by weight, because then optimum results are achieved.

The use of rubidium fluoride as a flux is preferred. In fact, when manufacturing luminescent aluminates, the highest brightnesses are obtained with this material. It is to be noted that the use of other alkalifluorides (such as sodium, lithium or ammonium fluoride) as a flux yields materials having low or even very low brightnesses, which is very surprising.

The reaction circumstances in a method according to the invention, such as the duration of the heat treatment and the temperature, may be chosen to be within wide limits, on the understanding that shorter heating periods may generally suffice when using comparatively high temperatures. A heat treatment of from 0.5 to 4 hours at a temperature of from 1200° to 1400° C is preferred. The atmosphere in which the heat treatment is carried out is of little influence in a method according to the invention and may be neutral, weakly reducing or oxidizing.

The fluoride used as a flux largely disappears by evaporation during the heat treatment. In many cases it is, however, preferred to remove flux residues, if any, from the resultant reaction product after cooling, by washing with water.

A method according to the invention is preferred in which a luminescent yttrium aluminate having the garnet structure is obtained. These materials may very advantageously be used in cathode-ray tubes, discharge lamps and the like. Particularly preferred is the manufacture, according to the invention, of cerium-activated aluminates defined by the formula $Y_{3-x}Ce_xAl_5O_{12}$, where $0.005 \leq x \leq 0.5$. These cerium-activated aluminates are often used in cathode-ray tubes for flying spot scanners.

The invention will now be described in greater detail with reference to the following examples.

EXAMPLE I

A mixture is made of 53.12 g $Y_2O_3$ and 62.4 g Al(OH)$_3$. This mixture is rubbed to a paste with 48 ml of a 0.1 M $Ce^{3+}$ solution and 2.5% by weight of RbF (approximately 2.90 g). After drying at 120° C the mixture is homogenized and subsequently heated for 2 hours in a closed quartz crucible at 1400° C. After cooling, the product obtained is washed with water and dried. The product is a luminescent cerium-activated aluminate defined by the formula $Y_{2.97}Ce_{0.03}Al_5O_{12}$ and has the garnet crystal structure as shown by means of an X-ray diffraction analysis. The aluminate has the shape of a satisfactorily crystallized powder and when excited by electrons it has a brightness of 110% relative to the brightness of a standard. As a standard a material defined by the same formula was used, but it was obtained by the known method starting from very reactive hydroxides.

EXAMPLES II to IV

The method according to example I is repeated several times, each time with a different quantity of RbF so as to determine the influence of the quantity of flux on the brightness of the obtained luminescent material. The measuring results of the brightness (in % relative to the above-mentioned standard) are stated in column H in the Table below.

Table

| example | % by weight RbF | H |
|---------|-----------------|-----|
| I       | 2.5             | 110 |
| II      | 5               | 120 |
| III     | 10              | 125 |
| IV      | 20              | 92  |

EXAMPLE V

The method according to example I is repeated, with the difference that 10% by weight of CsF instead of RbF is used in the starting mixture. The brightness of the obtained product upon electron excitation is 121% relative to the said standard.

EXAMPLE VI

The use of 10% by weight of KF instead of RbF in a method according to example I yields a luminescent aluminate having a brightness of 109% relative to the standard.

It is to be noted that the use of other alkali-fluorides as a flux leads to poor results in the manufacture of the rare-earth aluminates. This is apparent from the brightness measurements of cerium-activated yttrium aluminate obtained when using the optimum quantity of NaF, NH$_4$F and LiF which are: 92, 72 and 44%, respectively.

What is claimed is:

1. In the method of manufacturing a luminescent rare earth aluminate selected from the group consisting of the cerium activated rare earth aluminates of the formula Ln$_3$Al$_5$O$_{12}$ and LnAlO$_3$ wherein Ln is at least one element selected from those having atomic numbers 57 to 71 inclusive and yttrium by heating a starting mixture of the oxides required to produce said aluminate or of compounds capable of producing such oxides upon being heated, together with a flux at a temperature of from about 1200° to 1400° C for about 0.5 to 4 hours the improvement wherein the flux is at least one compound selected from the group consisting of rubidium fluoride, cesium fluoride and potassium fluoride employed in a quantity of from 0.1 to 15% by weight based on the starting mixture.

2. The method of claim 1 wherein the flux is employed in a quantity of from about 1% to 10% by weight.

3. The method of claim 2 wherein, after cooling, the resultant product is washed with water.

4. A method as claimed in claim 2, characterized in that rubidium fluoride is used as the flux.

5. A method as claimed in claim 2, characterized in that a luminescent yttrium aluminate having the garnet crystal structure is manufactured.

6. A method as claimed in claim 5, characterized in that the aluminate is defined by the formula $Y_{3-x}Ce_xAl_5O_{12}$, wherein $0.005 \leq x \leq 0.5$.

* * * * *